United States Patent
Marszal et al.

(10) Patent No.: US 7,618,514 B2
(45) Date of Patent: Nov. 17, 2009

(54) PHOTO-ETCHED EDM ELECTRODE

(75) Inventors: Dean N. Marszal, Southington, CT (US); James M. Koonankeil, Marlborough, CT (US)

(73) Assignee: United Technologies Corporation, Hartford, CT (US)

( * ) Notice: Subject to any disclaimer, the term of this patent is extended or adjusted under 35 U.S.C. 154(b) by 38 days.

(21) Appl. No.: 11/347,343

(22) Filed: Feb. 3, 2006

(65) Prior Publication Data
US 2009/0255110 A1    Oct. 15, 2009

(51) Int. Cl.
*B23H 1/04* (2006.01)
*C23F 1/00* (2006.01)
*B23H 9/10* (2006.01)

(52) U.S. Cl. ................ 156/345.1; 219/69.15
(58) Field of Classification Search .......... 219/69.15, 219/69.17; 156/345.1, 345.5; 216/13
See application file for complete search history.

(56) References Cited

U.S. PATENT DOCUMENTS

| | | | | |
|---|---|---|---|---|
| 4,023,998 | A | | 5/1977 | Cederberg et al. ........ 156/630 |
| 4,388,146 | A | * | 6/1983 | Ballato ................... 156/345.5 |
| 4,462,724 | A | | 7/1984 | Miettunen et al. ............ 407/30 |
| 4,649,937 | A | * | 3/1987 | DeHaan et al. ............. 607/115 |
| 4,850,147 | A | * | 7/1989 | Baker ......................... 451/58 |
| 4,922,076 | A | * | 5/1990 | Cross et al. ............. 219/69.15 |
| 5,018,259 | A | | 5/1991 | Wildman ................... 29/160.6 |
| 5,057,401 | A | * | 10/1991 | Borysko et al. ............. 430/320 |
| 5,100,506 | A | * | 3/1992 | Sturtevant et al. ............ 216/47 |
| 5,357,073 | A | | 10/1994 | Tominaga et al. |
| 5,389,196 | A | * | 2/1995 | Bloomstein et al. .......... 216/66 |
| 5,461,769 | A | * | 10/1995 | McGregor ................. 29/527.4 |
| 6,310,312 | B1 | * | 10/2001 | Higuerey et al. ......... 219/69.17 |
| 6,897,401 | B2 | * | 5/2005 | Kildea ..................... 219/69.17 |
| 7,167,173 | B2 | * | 1/2007 | Balmelli et al. ............. 345/419 |
| 2003/0012921 | A1 | * | 1/2003 | Gallant et al. .............. 428/100 |
| 2003/0054296 | A1 | * | 3/2003 | Howell ....................... 216/49 |

FOREIGN PATENT DOCUMENTS

| | | | |
|---|---|---|---|
| JP | 8-11017 A | * | 1/1996 |
| JP | 8-25143 A | * | 1/1996 |
| JP | 09-253936 A | * | 9/1997 |
| JP | 11-197944 A | * | 7/1999 |

OTHER PUBLICATIONS

Andrews, Photo-Chemical Machining and Electroforming of 3D components, 1997, Institute of Electrical Engineers(IEE), pp. 9/1 to 9/4.*
Allen, PhotoChemcial Machining: from 'manufacturing's best kept secret' to a $6 billion per annum, rapid manufacturing process, 2004, CIRP Annals-Manufacturing Technology, vol. 53, Issue 2, pp. 559-572.*
European Search Report dated Dec. 20, 2007.

* cited by examiner

*Primary Examiner*—Geoffrey S Evans
(74) *Attorney, Agent, or Firm*—Carlson, Gaskey & Olds

(57) ABSTRACT

An electrical discharge machining electrode includes a body and one or more shaped teeth. The one or more shaped teeth of the body have a diffuser section and a metering section in electrical communication therewith. The body and the teeth may be formed by a process of photochemically etching a substrate made from an electrically conductive material.

13 Claims, 2 Drawing Sheets

PHOTO-ETCHED EDM ELECTRODE

BACKGROUND OF THE INVENTION

1. Field of the Invention

This invention relates generally to electrodes and, more particularly, to a method and apparatus for an electrical discharge machining electrode.

2. Description of the Related Art

An axial flow rotary machine, such as a gas turbine engine for an aircraft, has a compression section, a combustion section, and a turbine section. An annular flow path for working medium gases extends axially through the sections of the engine. The gases are compressed in the compression section to raise their temperature and pressure. Fuel is burned with the working medium gases in the combustion section to further increase the temperature of the hot, pressurized gases. The hot, working medium gases are expanded through the turbine section to produce thrust and to extract energy as rotational work from the gases. The rotational work is transferred to the compression section to raise the pressure of the incoming gases.

The compression section and turbine section have a rotor that extends axially through the engine. The rotor includes arrays of rotor blades that transfer rotational work between the rotor and the hot working medium gases. Each rotor blade has an airfoil for this purpose which extends outwardly across the working medium flow path. The working medium gases are directed through the airfoils. The airfoils in the turbine section receive energy from the working medium gases and drive the rotor at high speeds about an axis of rotation. The airfoils in the compression section transfer this energy to the working medium gases to compress the gases as the airfoils are driven about the axis of rotation by the rotor.

The engine includes a stator disposed about the rotor. The stator has an outer case and arrays of stator vanes that extend inwardly across the working medium flowpath. The arrays of stator vanes are disposed upstream of the arrays of rotor blades in both the compression section and turbine section. The stator vanes each have an airfoil for guiding the working medium gases to the rotor blades as the gases are flowed along the flow path. The airfoils of the stator vanes and the rotor blades are designed to receive, interact with and discharge the working medium gases as the gases are flowed through the engine.

Blades, vanes, airfoils, such as, for example, stator vanes, rotor blades, and airfoils described above, and other parts are generally designed with one or more holes, such as, for example, cooling holes. Removing heat from a surface is highly dependent on air flow through the cooling holes. By providing shaped cooling holes to diffuse the exiting air, heat can be removed more efficiently, allowing the surfaces of blades, vanes, airfoils, and the like to withstand higher temperatures. EDM (electrical discharge machining) uses electrodes for providing precisely shaped cooling holes. FIG. 1 illustrates an exemplary electrode 1 having shaped teeth 2 containing diffuser sections 6 and metering sections 4. Exemplary electrode 1 concurrently produces as many shaped holes in the part as there are teeth 2.

Currently, electrodes are manufactured by a process of stamping or wire EDM. Wire EDM may be used for all electrode designs, however, is limited to low volume production due to the manufacturing process cycle time. Electrodes manufactured by stamping require tooling dies that have a long lead time, e.g., 10 months. Moreover, dies may have a tooling and design cost that exceeds $100,000.00. As a result, new airflow designs are undesirable due to expense and lengthy lead times of manufacturing new electrodes, and, thus, components such as, airfoils, vanes, and blades may be machined by existing electrodes having a less than optimum design. Furthermore, dies wear over time, adversely affecting the quality of electrodes made using the dies.

Accordingly, there is a need for an improved method of producing an electrical discharge machining electrode.

There is a further need for a method of producing an electrical discharge machining electrode having a reduced lead time and a reduced cost over the prior art.

SUMMARY OF THE INVENTION

In one aspect, an electrical discharge machining electrode including a body having one or more shaped teeth is provided. The one or more shaped teeth have a diffuser section and a metering section on the body and in electrical communication with the body. The body and the teeth are formed by a process of photochemically etching a substrate made from an electrically conductive material.

A method of producing an electrical discharge machining electrode is also provided. The method includes forming a body and one or more teeth on the body and in electrical communication with the body via a process comprising photochemically etching a substrate.

The process may further comprise creating a design of the electrical discharge machining electrode. The design may have substantially equal dimensions as the electrical discharge machining electrode. The process may further comprise producing a photo-tool of the design. The process may further comprise applying the photo-tool to the substrate to form a substrate photo-tool combination. The process may further comprise photochemically etching the substrate photo-tool combination. The design may be a two dimensional design. Creating the design may comprise generating the design by a computer. The design may comprise a computer generated two-dimensional design. The process may further comprise creating a design of the electrical discharge machining electrode. The process may further comprise producing a photo-tool of the based on the design.

The process may further comprise producing a photo-tool of the based on the design. The process may further comprise applying the photo-tool to the substrate forming a substrate photo-tool combination prior to the step of photo etching. The substrate may comprise the substrate photo-tool combination. Creating the design may comprise generating the design by a computer. The substrate may be made from an electrically conductive material. Creating the design may comprise creating a design by a process selected from the group consisting essentially of a photographic negative, a photocopy on a transparency, freehand drawing on a transparency, a raster or victor image file and port by laser photo porter, and any combination thereof. The photo-tool may be a photo-sensitive coating. Photochemically etching the substrate may comprise spraying the substrate with acidic etchant to remove a portion of the substrate not covered by the photo-tool. Producing the photo-tool may comprise producing a master of the electrical discharge machining electrode to produce a multiple negative containing one or more images of the electrical discharge machining electrode.

The above-described and other features and advantages of the present disclosure will be appreciated and understood by those skilled in the art from the following detailed description, drawings, and appended claims.

DETAILED DESCRIPTION OF THE INVENTION

Figure 1:
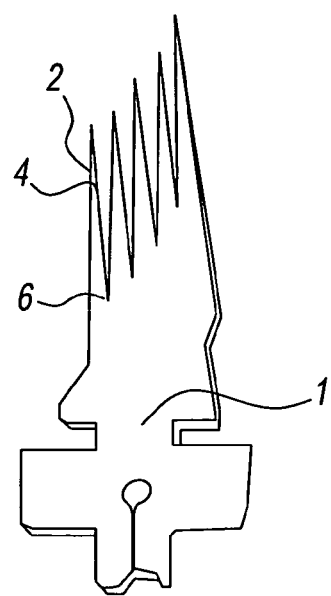
FIG. 1 is an exemplary electrical discharge machining electrode made using prior art methods.
Figure 2:
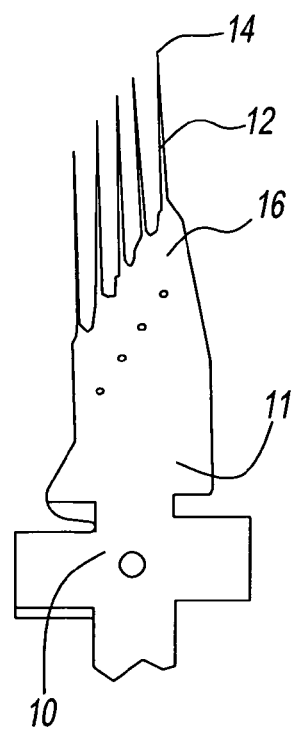
FIG. 2 is an electrical discharge machining electrode in accordance with the present invention.

Referring now to FIG. 2, an exemplary embodiment of an electrode of the present invention generally referred to by reference numeral 10 is illustrated. Electrode 10 is manufactured by a photochemical etching process. The photochemical etching process minimizes development and design times, thus, minimizing lead time and eliminating production of costly dies and, consequently, die wear. Moreover, electrode 10 may be manufactured within tolerances substantially the same as prior art methods of making electrode 1.

Figure 3:
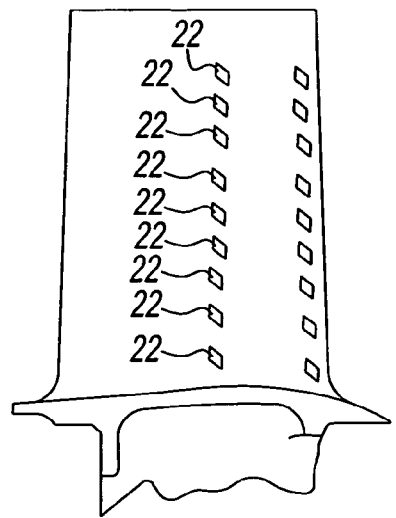
FIG. 3 is an airfoil having a plurality of holes formed by the electrical discharge machining electrode of FIG. 2.

In an exemplary embodiment, the photochemical etching process uses a negative or a photo-tool of a design of electrode 10. Electrode 10 is designed as in step 50 of FIG. 4, relative to a component that is to be machined by electrode 10. For example, an airfoil 20 may be machined by an electrode having a plurality of teeth via electrical discharge machining to drill or form one or more cooling holes 22, as shown in FIG. 3, corresponding to a plurality of teeth 12 of the electrode 10. Alternatively, the component can be other parts, such as, for example, a vane, blade, air seal, combustor, augmentor, and/or the like. The design of electrode 10 may have one or more teeth 12 containing a diffuser section 14 and a metering section 16 connected to a body 11. The design of electrode 10, preferably, is a two dimensional computer generated design. Dimensions of the design may be reduced by a photographic reduction process, such as, for example, to scale of electrode 10.

Figure 4:
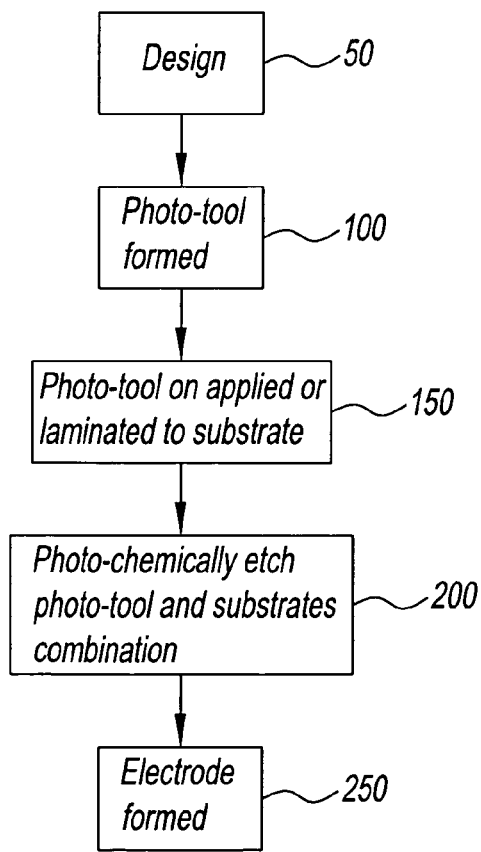
FIG. 4 is a schematic diagram of a method for the electrical discharge machining electrode of FIG. 2.

The two dimensional computer generated design may be formed into the photo-tool 100, as illustrated in FIG. 4, by processes known in the art. For example, the photo-tool may be a transparency such as plastic sheet with a black and white pattern prepared by a photographic negative, a photocopy on a transparency, freehand drawing on a transparency, a raster or vector image file and port by laser photo porter, and any combination thereof. Preferably, a film or glass master of the two dimensional computer generated design is produced. The master, preferably, has dimensions substantially identical to electrode 10. The master may produce a multiple negative containing one or more images of electrode 10, preferably, by a photo-repeating machine. The multiple negative, preferably, is a photo-sensitive coating forming the photo-tool. The design of electrode 10 may be transparent and a remaining portion of the photo-tool may be opaque. A shaped section of the electrode may be created by utilizing a gray scale methodology on the photo-tool to generate a three-dimensional shaped diffuser section on the electrode.

In fact, the teeth by the term "shaped" can be seen to be generally planar in two dimensions, but having a cross-section in a third dimension, which varies. This is apparent from the shape of the holes 22 in the blade as shown in FIG. 3. This three-dimensional shape at the diffuser section is necessary to provide anything other than a rectangular shaped hole in the blade. Stated another way, the cross-sectional shape of the teeth along an axis of the teeth 12 is non-rectangular, such that holes, such as holes 22, can be formed by the teeth.

The substrate and photo-tool combination is then photochemically etched 200, as shown in FIG. 4. Such processes are chosen to facilitate application or lamination and are known by one of ordinary skill in the art. One process sprays the substrate with acidic etchant removing all metal not covered by the photo-tool or photo-sensitive coating to form electrode 10 as shown by reference numeral 250 in FIG. 4. Alternatively, a photochemical etch operation dissolves and/or removes material covered by dark or black areas of the photo-tool and transparent areas are not removed forming electrode 10. Photochemically etching the substrate preserves properties of the substrate such as, for example, hardness, grain structure, and ductility, and eliminates process induced stress, such as, for example, internal stress.

The particular type, including materials, dimensions and shape, of electrode 10, photo-tool, substrate, and photochemical etch process that are utilized can vary according to the particular needs of electrode 10. Thus, electrodes may be manufactured with a reduced lead time, e.g., 2 to 3 weeks versus 10 months for stamped electrodes. Moreover, costly dies are eliminated along with die wear that affects electrode manufacturing tolerance. As a result, components may be machined by electrodes having an optimum design and new airflow configurations may be more frequently demonstrated.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed, but that the invention will include all embodiments falling within the scope of the appended claims.

What is claimed is:

1. A method of producing an electrical discharge machining electrode, the method comprising:
   forming a body and one or more teeth on said body and in electrical communication with said body via a process comprising photochemically etching a substrate, said teeth having a non-rectangular cross-section taken perpendicular to an axis along a direction in which said teeth extend from said body.

2. The method of claim 1, wherein said substrate is made from an electrically conductive material.

3. The method of claim 1, wherein photochemically etching said substrate comprises spraying said substrate with acidic etchant to remove a portion of said substrate not covered by said photo-tool.

4. The method of claim 1, wherein said body is generally planar with said teeth being of a cross-section extending in a third dimension into a plane of said planar body and cross-sections of said planar body along said third dimension vary to provide a three-dimensional shape to said teeth.

5. The method of claim 4, wherein a gray scale technique is utilized to form said three-dimensional shape of said teeth.

6. The method of claim 1, wherein the process further comprises creating a design of the electrical discharge machining electrode.

7. The method of claim 2, wherein creating said design comprises generating said design by a computer.

8. The method of claim 6, wherein creating said design comprises creating a design by a process selected from the group consisting essentially of a photographic negative, a photocopy on a transparency, freehand drawing on a transparency, a raster or victor image file and port by laser photo porter, and any combination thereof.

9. The method of claim 6, wherein the process further comprises producing a photo-tool based on the design.

10. The method of claim 9, wherein the process further comprises applying said photo-tool to said substrate forming a substrate photo-tool combination prior to the step of photo etching.

11. The method of claim 10, wherein said substrate comprises said substrate photo-tool combination.

12. The method of claim 9, wherein said photo-tool is a photosensitive coating.

13. The method of claim 9, wherein producing said photo-tool comprises producing a master of the electrical discharge machining electrode to produce a multiple negative containing one or more images of the electrical discharge machining electrode.

* * * * *